(12) United States Patent
Cichy et al.

(10) Patent No.: US 12,314,744 B1
(45) Date of Patent: May 27, 2025

(54) TECHNOLOGIES FOR ENABLING RULE ENGINES TO GUIDE END USERS IN COMPLETING TRANSACTIONS WITH USER ACTIONS

(71) Applicant: Monarch Specialty Group, Inc., Chicago, IL (US)

(72) Inventors: Stephen Barrett Cichy, Chicago, IL (US); Markus Daniel Bockle, Chicago, IL (US)

(73) Assignee: Monarch Specialty Group, Inc., Chicago, IL (US)

( * ) Notice: Subject to any disclaimer, the term of this patent is extended or adjusted under 35 U.S.C. 154(b) by 0 days.

(21) Appl. No.: 18/962,064

(22) Filed: Nov. 27, 2024

(51) Int. Cl.
 *G06F 9/451* (2018.01)
 *G06F 16/955* (2019.01)

(52) U.S. Cl.
 CPC ............ *G06F 9/453* (2018.02); *G06F 16/955* (2019.01)

(58) Field of Classification Search
 CPC .............................. G06F 9/453; G06F 16/955
 See application file for complete search history.

(56) References Cited

U.S. PATENT DOCUMENTS

| | | | |
|---|---|---|---|
| 7,111,780 B2 | 9/2006 | Broussard |
| 7,840,424 B2 | 11/2010 | Wiley |
| 7,856,364 B1 | 12/2010 | Wiley |
| 7,979,285 B2 | 7/2011 | Wiley |
| 8,032,397 B2 | 10/2011 | Lawless |
| 8,036,913 B1 | 10/2011 | Pinsonneault |
| 8,036,914 B1 | 10/2011 | Pinsonneault |
| 8,036,918 B1 | 10/2011 | Pinsonneault |
| 8,050,943 B1 | 11/2011 | Wiley |
| 8,060,379 B1 | 11/2011 | Pinsonneault |
| 8,190,453 B2 | 5/2012 | Rowe, III |
| 8,392,214 B1 | 3/2013 | Pinsonneault |
| 8,392,219 B1 | 3/2013 | Pinsonneault |
| 8,589,181 B2 | 11/2013 | Berzansky |
| 8,670,999 B2 | 3/2014 | Berzansky |
| 8,781,854 B1 | 7/2014 | Harris, Sr. |
| 8,924,231 B2 | 12/2014 | Hoffman |
| 9,076,186 B2 | 7/2015 | Burkett |
| 9,231,935 B1 | 1/2016 | Bridge |
| 9,760,871 B1 | 9/2017 | Pourfallah |
| 9,904,965 B2 | 2/2018 | White |
| 10,157,262 B1 | 12/2018 | Pinsonneault |
| 10,192,193 B1 | 1/2019 | Glass |
| 10,248,641 B2 | 4/2019 | Wagh |
| 10,417,380 B1 | 9/2019 | Kaye |
| 10,489,552 B2 | 11/2019 | Pinsonneault |
| 10,496,793 B1 | 12/2019 | Lawrence |
| 10,565,656 B1 | 2/2020 | Pinsonneault |
| 10,616,146 B1 | 4/2020 | Hopkins |
| 2004/0153336 A1 | 8/2004 | Virdee |
| 2007/0276697 A1 | 11/2007 | Wiley |

(Continued)

*Primary Examiner* — Asher D Kells
(74) *Attorney, Agent, or Firm* — Dentons US LLP

(57) ABSTRACT

This disclosure enables a rule engine programmed for (i) expressing complex logic, (ii) handling time/event synchronization, (iii) providing insights into rule execution, and (iv) modeling uncertainties, while also enabling user actions to authenticate, approve, initiate, or decline certain workflows. Such configuration is technologically advantageous, because of its enablement in providing guidance to end users in completing transactions with user actions.

20 Claims, 7 Drawing Sheets

400

(56) References Cited

U.S. PATENT DOCUMENTS

| | | |
|---|---|---|
| 2010/0217622 A1 | 8/2010 | Brown |
| 2011/0145011 A1 | 6/2011 | Shell |
| 2013/0054261 A1 | 2/2013 | Dufour |
| 2013/0211856 A1 | 8/2013 | Pribyl |
| 2013/0226608 A1 | 8/2013 | Di Lascia |
| 2014/0189808 A1* | 7/2014 | Mahaffey ............ G06F 21/6245 726/4 |
| 2014/0200928 A1 | 7/2014 | Watanabe |
| 2015/0228030 A1 | 8/2015 | Scantland |
| 2015/0234991 A1 | 8/2015 | Pinsonneault |
| 2020/0242570 A1* | 7/2020 | Benkreira ............ G06Q 20/102 |
| 2022/0150234 A1* | 5/2022 | Clancy .................... G06F 21/34 |
| 2022/0374846 A1* | 11/2022 | Burnam ................ G06Q 20/389 |
| 2022/0398667 A1* | 12/2022 | Cichy ................. G06Q 30/0207 |
| 2023/0061296 A1* | 3/2023 | Bantanur ............ G06Q 20/123 |
| 2024/0296501 A1 | 9/2024 | Cichy |

\* cited by examiner

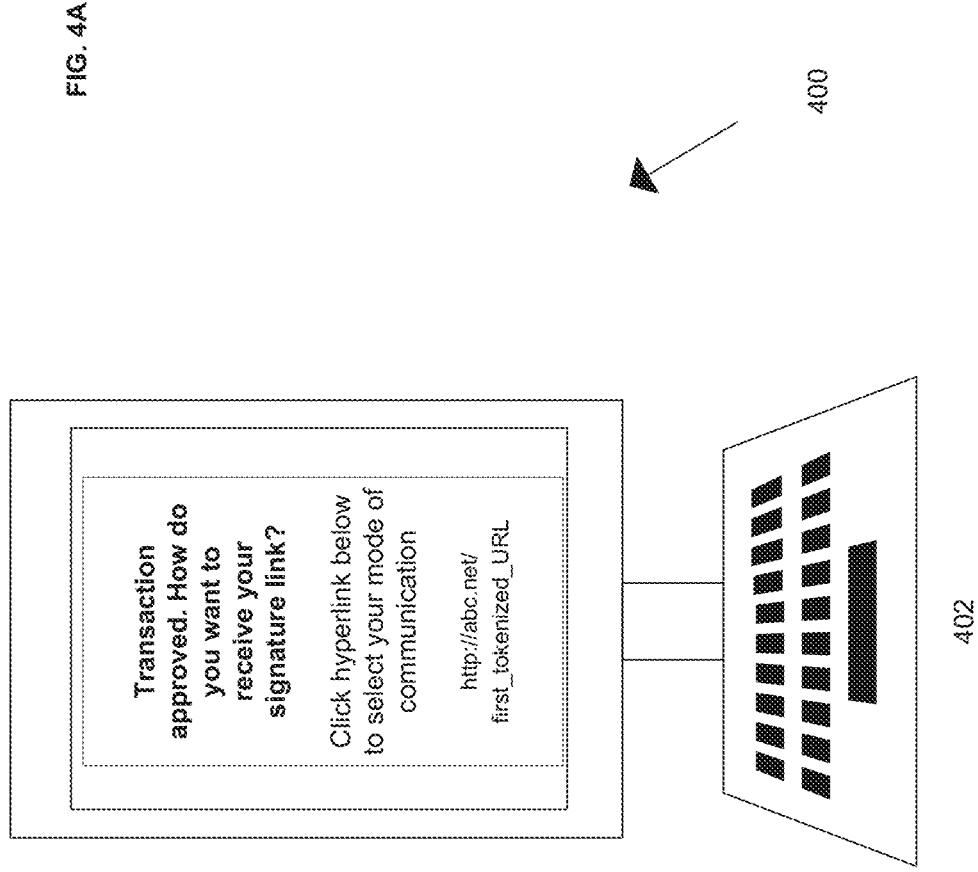

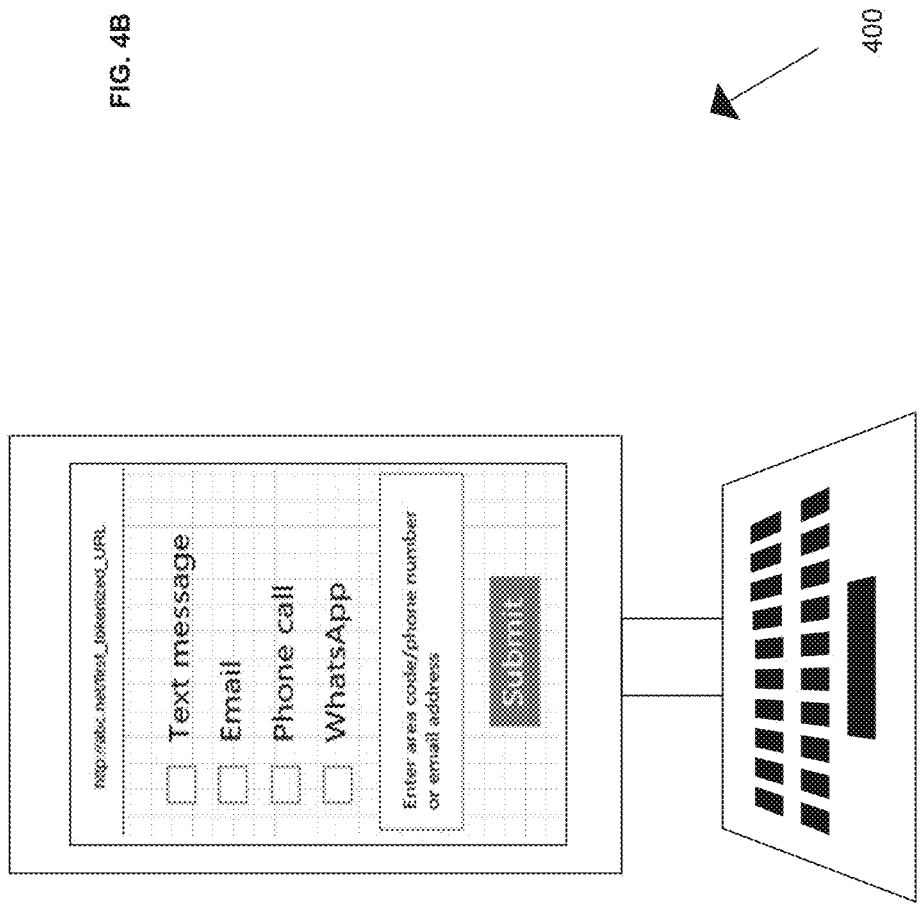

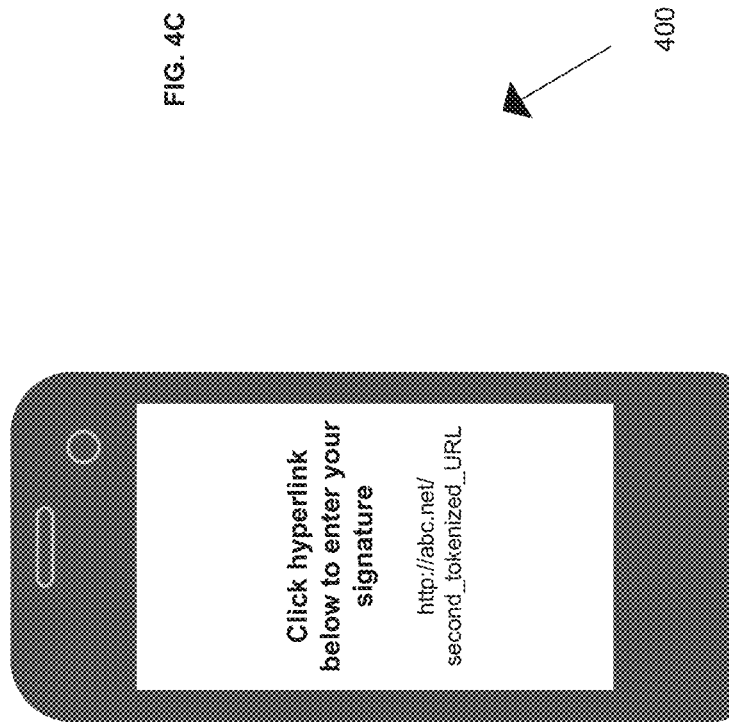

TECHNOLOGIES FOR ENABLING RULE ENGINES TO GUIDE END USERS IN COMPLETING TRANSACTIONS WITH USER ACTIONS

TECHNICAL FIELD

This disclosure relates to rule engines that guide end users in completing transactions with user actions.

BACKGROUND

Conventionally, a rule engine may be programmed to apply a business rule to an input (e.g., a message) received from a data source (e.g., an application program). This modality of computing promotes agility and adaptability for processes driven by dynamic rules and regulations, by decoupling a business logic from an application logic, thereby allowing a business user to modify the business logic, by modifying the business rule, without changing the application logic, especially when the data source is subject to change. Resultantly, the rule engine may be forward-chaining (e.g., processing condition-action rules) or reactive (e.g., detecting and reacting to events and patterns). However, despite the rule engine having such technological benefits, the rule engine still suffers from various technological drawbacks. For example, the rule engine may be limited in (i) expressing complex logic, (ii) handling time/event synchronization, (iii) providing insights into rule execution, and (iv) modeling uncertainties. Additionally, there may be situations where user actions are desired to authenticate, approve, initiate, or decline certain workflows.

SUMMARY

This disclosure enables a rule engine programmed for (i) expressing complex logic, (ii) handling time/event synchronization, (iii) providing insights into rule execution, and (iv) modeling uncertainties, while also enabling user actions to authenticate, approve, initiate, or decline certain workflows. Such configuration is technologically advantageous, because of its enablement in providing guidance to end users in completing transactions with user actions.

DESCRIPTION OF DRAWINGS

FIG. 4A to FIG. 4D show a set of diagrams of a set of embodiments of a set of screenshots enabling a user action pursuant to FIG. 1 to FIG. 3 according to this disclosure.

DETAILED DESCRIPTION

Figure 1:
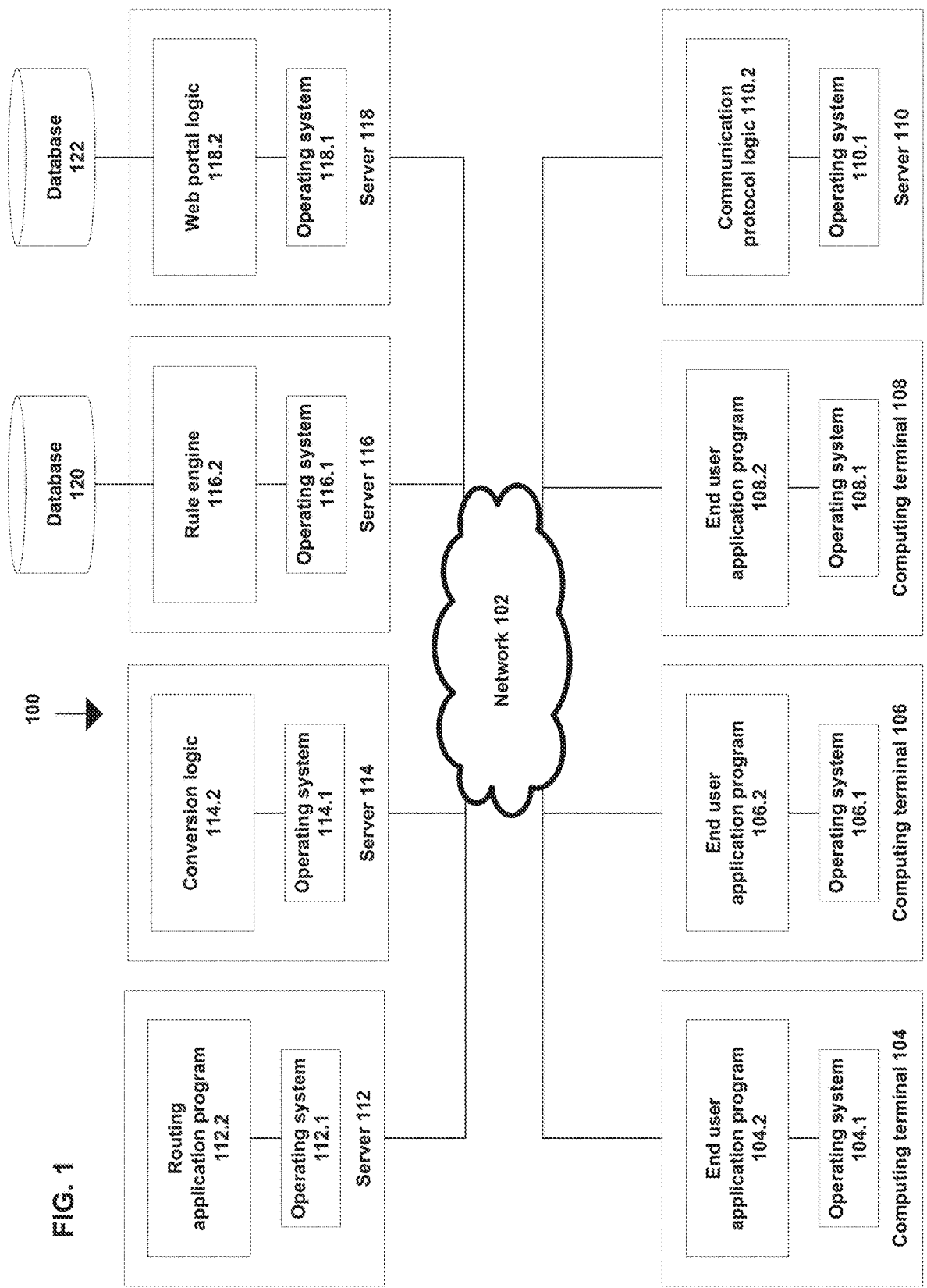
FIG. 1 shows a diagram of an embodiment of a system for providing guidance to end users in completing transactions with user actions according to this disclosure.

As explained above, this disclosure enables a rule engine programmed for (i) expressing complex logic, (ii) handling time/event synchronization, (iii) providing insights into rule execution, and (iv) modeling uncertainties, while also enabling user actions authenticate, approve, initiate, or decline certain workflows. Such configuration is technologically advantageous, because of its enablement in providing guidance to end users in completing transactions.

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled persons.

Various terminology used herein can imply direct or indirect, full or partial, temporary or permanent, action or inaction, individual or collective. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of natural inclusive permutations. That is, if X employs A; X employs B; or X employs both A and B, then "X employs A or B" is satisfied under any of foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes," "contains," "has," or "comprising," "including," "containing," or "having" (or any tenses thereof) when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

As used herein, a term "about" or "substantially" refers to a +/−10% variation from a nominal value/term. Such variation is always included in any given value/term provided herein, whether or not such variation is specifically referred thereto.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled persons understand that typically there is no limit on a number of items or terms in any combination, unless otherwise contextually apparent.

Features or functionality described with respect to certain embodiments may be combined or sub-combined in or with various embodiments in any permutational or combinatorial manner. Different aspects or elements of embodiments, as disclosed herein, may be combined or sub-combined in a similar manner. A skilled person will understand that typically there is no limit on a number of items or terms in any combination, unless otherwise contextually apparent Some embodiments, whether individually or collectively, can be components of a larger system, where other procedures can take precedence over or otherwise modify their application. Additionally, a number of steps can be required before, after, or concurrently with embodiments, as disclosed herein. Note that any or all methods or processes, at least as disclosed herein, can be at least partially performed via at least one entity in any manner.

Some embodiments are described herein with reference to illustrations of idealized embodiments (and intermediate structures) of this disclosure. As such, variations from various illustrated shapes as a result, for example, of manufacturing techniques or tolerances, are to be expected. Thus, various embodiments should not be construed as necessarily limited to various particular shapes of regions illustrated herein, but are to include deviations in shapes that result, for example, from manufacturing.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

United States Patent Application Publication 2022/0398667 (Ser. No. 17/399,178) is incorporated by reference herein for all purposes. Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 shows a diagram of an embodiment of a system for providing guidance to end users in completing transactions with user actions according to this disclosure. In particular, there is a system 100 containing a network 102, a computing terminal 104, a computing terminal 106, a computing terminal 108, a server 110, a server 112, a server 114, a server 116, a server 118, a database 120 and a database 122.

The first computing terminal 104 hosts an operating system (OS) 104.1 and a first end user application program 104.2 (and potentially other application programs) such that the first end user application program 104.2 (and potentially other application programs) runs on the first OS 104.1. The second computing terminal 106 hosts an OS 106.1 and a second end user application program 106.2 (and potentially other application programs) such that the second end user application program 106.2 (and potentially other application programs) runs on the second OS 106.1. The third computing terminal 108 hosts an OS 108.1 and a third end user application program 108.2 (and potentially other application programs) such that the third end user application program 108.2 (and potentially other application programs) runs on the third OS 108.1. For example, the third OS 108.1 may host a browser application program or a messaging application program (e.g., a text messenger, a chat messenger, an email messenger).

The server 110 hosts an OS 110.1 and a communication protocol logic 110.2 (and potentially other logic or application programs) such that the communication protocol logic 110.2 (and potentially other logic or application programs) runs on the OS 110.1. The server 112 hosts an OS 112.1 and a routing application program 112.2 (and potentially other application programs) such that the routing application program 112.2 (and potentially other application programs) runs on the OS 112.1. The server 114 hosts an OS 114.1 and a conversion logic 114.2 (and potentially other logic or application programs) such that the conversion logic 114.2 (and potentially other logic or application programs) runs on the OS 114.1. The server 116 hosts an OS 116.1 and a rule engine 116.2 (and potentially other application programs) such that the rule engine 116.2 (and potentially other application programs) runs on the OS 116.1. The server 118 hosts an OS 118.1 and a web portal logic 118.2 (and potentially other logic or application programs) such that the web portal logic 118.2 (and potentially other logic or application programs) runs on the OS 118.1. The database 120 is hosted external (e.g., physically, logically) to the server 116, although the server 116 may host the database 120. The database 122 is hosted external (e.g., physically, logically) to the server 118, although the server 118 may host the database 122.

The network 102 may be a Local Area Network (LAN), a Wide Area Network (WAN), a cellular network, a satellite network, or another suitable network, whether private or public. The network may include Internet.

The first computing terminal 104, the second computing terminal 106, or the third computing terminal 108 may be a desktop computer, a laptop computer, a tablet computer, a mobile phone, a smartphone, a wearable computer, a vehicular computer, a Point-Of-Sale computing terminal (e.g., a cash register), or another suitable computing form factor, whether stationary or mobile. For example, the first computing terminal 104, the second computing terminal 106, or the third computing terminal 108 may be a positioned (e.g., collocated) in a defined area (e.g., a room, a building, a store, a pharmacy, a hospital). For example, the first computing terminal 104, the second computing terminal 106, or the third computing terminal 108 may be a computing workstation that is freestanding, stationary, or standalone on a surface, such as a shelf, a tabletop, a floor, a carpet, a tile, or another suitable surface. For example, the computing workstation may be a desktop Personal Computer (PC) tower, a micro tower, a slim form factor, an All-In-One (AIO) desktop PC, a mini PC, a Small Form Factor (SFF), an Ultra SFF, a Nettop, an ultra-compact, a mini PC, a PC-on-a-Stick, or another suitable form factor. For example, the computing workstation may avoid itself having a display, but is connected (e.g., wired, wireless, waveguide) to a computer monitor, a keyboard, a cursor control device (e.g., a mouse, a touchpad), a printer, or another suitable computing peripheral. For example, the computing workstation may be a kiosk. For example, the computing workstation may be powered from a mains electrical socket. Note that in some embodiments the first computing terminal 104 and the second computing terminal 106 are separate and distinct from each other. However, in other embodiments, the first computing terminal 104 and the second computing terminal 106 are one computing terminal.

The first OS 104.1, the second OS 106.1, or the third OS 108.1 may be Windows, Linux, MacOS, Android, IOS, or any other suitable OS.

The first end user application program 104.2 (and potentially other application programs) runs on the first OS 104.1. The first end user application program 104.2 may be a browser application program, a domain specific application program, or another suitable program. For example, the domain specific application program 104.2 may be a pharmacy application program (e.g., operated by a pharmacist or a pharmacy technician in a pharmacy locale) having a software logic/UIs programmed to manage prescriptions (e.g., by identifiers), a software logic/UI programmed to manage inventory of medications (e.g., by identifiers), a software logic/UIs programmed to provide patient management/safety (e.g., by identifiers), a software logic/UIs programmed to manage regulatory compliance (e.g., by permissioning for patient privacy, controlled substances, state laws), and a software logic/UIs programmed to integrate with third party computing systems (e.g., by electronic health records, insurance e-billing).

The second end user application program 106.2 (and potentially other application programs) runs on the second OS 106.1. The second end user application program 106.2 may be a browser application program, a domain specific application program, or another suitable program.

The third end user application program 108.2 (and potentially other application programs) runs on the third OS 108.1. The third end user application program 108.2 may be a messaging application program (e.g., a text messenger, a chat messenger, an email messenger) or another suitable program. Also, the third OS 108.1 may host a browser application program simultaneous with the third end user application program 108.2.

The server 110 may be an application server or another suitable server. The OS 110.1 may be Windows, Linux, MacOS, Android, IOS, or any other suitable OS. The OS 110.1 hosts the communication protocol logic 110.2, which may be embodied as an application program, a software module, a software engine, an Application Programming Interface (API), or another suitable logical form factor. The communication protocol logic 110.2 may be programmed to be triggered such that the communication protocol logic 110.2 can generate a notification containing a Uniform Resource Locator (URL), which may be a tokenized URL, as described further herein. Also, the communication protocol logic 110.2 may be programmed to send the notification according a selection and a destination identifier to the third end user application program 108.2, as described further herein. For example, the communication protocol logic 110.2 may send the communication over the network 102, which may be over a cellular data network connection, a WAN data network connection, a satellite data network connection, or another suitable data network connection.

The server 112 may be an application server or another suitable server. The OS 112.1 may be Windows, Linux, MacOS, Android, IOS, or any other suitable OS. The routing application program 112.2 runs on the OS 112.1. The routing application program 112.2 may be a message routing program that is programmed to facilitate efficient receiving, processing, and sending messages between various computing systems to enable corresponding transactions to be completed. For example, a transaction may correspond to a single message (one-to-one) or a set of messages (one-to-many). For example, the routing application program 112.2 may be a medical claim application program that is programmed to facilitate efficient receiving, processing, and sending of messages, which embody medical claims by content (e.g., text), submitted by pharmacies to insurance companies or payers. The medical claim application program may have a software logic/UIs programmed to route messages (e.g., medical claims) submitted by pharmacies computing systems to appropriate insurance computing systems or pharmacy benefit manager computing systems based on appropriate insurance coverage and plan information as validated based on contents of those messages. The medical claim application program may have a software logic/UIs programmed to perform initial editing and validation of messages (e.g., medical claims) to ensure that those messages meet a certain required format (if needed) and contain accurate data. The medical claim application program may have a software logic/UIs programmed to perform real-time transacting (e.g., adjudication by approval or denial) of messages (e.g., medical claims) by seamlessly integrating with payers' claims computing processing systems. The medical claim application program may have a software logic/UIs programmed to perform tracking and monitoring of statuses of submitted messages (e.g., medical claims), as well as generating reports and analytics. The medical claim application program may have a software logic/UIs programmed to integrate with existing pharmacy computing management systems, enabling seamless submission of messages (e.g., medical claims) from pharmacy workflows, while minimizing or eliminating manual data entry or separate computing systems.

The routing application program 112.2 may be programmed to route messaging based on parsing (e.g., textually) those messages. For example, such routing may occur based on a set of predefined business rules and logic to determine various appropriate paths and destinations for received messages (e.g., medical claims). As such, in context of medical claim processing, the routing application program 112.2 may have a message intake logic (e.g., a software module) that receives messages (e.g., medical claims) from various sources, such as providers, clearinghouses, or other healthcare entities (e.g., formatted pursuant to Electronic Data Interchange (EDI) X12 837). Further, the routing application program 112.2 may have a claim parsing logic (e.g., a software module) that parses (e.g., by text) messages (e.g., medical claims) to extract relevant information (e.g., text), such as patient details, provider information, diagnosis codes, procedure codes, and insurance details. Also, the routing application program 112.2 may have a rule evaluation logic (e.g., a software module) that, based on extracted claim data, evaluates a set of predefined business rules to determine an appropriate routing path. For example, these rules can be based on various factors, such as patient's insurance plan and network affiliations, provider's participation in specific networks or Preferred Provider Organizations (PPOs), geographic location of the provider or patients, claim type (e.g., medical, dental, institutional), presence of specific diagnosis or procedure codes, or other suitable factors. Moreover, the routing application program 112.2 may have a routing destination determination logic (e.g., a software module) that, based on evaluated rules, identifies appropriate destination(s) for routing messages (e.g., medical claims), such as computing systems (e.g., APIs, File Transfer Protocol (FTP) sites, web portals) of payers or insurance companies, third-party administrators, repricing vendors or PPO networks, auditing or review entities, or other suitable destinations. Furthermore, the routing application program 112.2 may have a claim transmission logic (e.g., a software module) that transmits messages (e.g., medical claims) to identified destination(s) using appropriate EDI formats or secure FTP sites, APIs, web portals or other suitable data recipient software. This may involve point-to-point routing (e.g., direct transmission to recipients) or wrap routing (routing through intermediary networks or entities). Also, the routing application program 112.2 may have a tracking and auditing logic (e.g. a software module) that enables maintenance of an audit trail, tracking how messages move among data recipients and status throughout routing processes, such as by monitoring timestamps, recipient information, and any errors or exceptions encountered during routing. Additionally, the routing application program 112.2 may be have an exception handling logic (e.g., a software module) that handles issues or exceptions that may arise during routing (e.g., invalid data, missing information, rule conflicts), which may involve or enable alerts, notifications, or manual intervention workflows to resolve identified issues.

The server 114 may be an application server or another suitable server. The OS 114.1 may be Windows, Linux, MacOS, Android, IOS, or any other suitable OS. The OS 114.1 hosts the conversion logic 114.2, which may be embodied as an application program, a software module, a software engine, an API, or another suitable logical form factor. For example, if embodied as the API, then the API may be a Representational State Transfer (REST) API, a Simple Object Access Protocol (SOAP) API, or another suitable API. The conversion logic 114.2 may be programmed to convert messages from one data format (e.g., flat file, matrix format, National Council for Prescription Drug Programs (NCPDP) format) to another data format (e.g., structured, delimited, Java Script Object Notation (JSON), Extensible Markup Language (XML), Comma Separated Values (CSV)) or vice versa. For example, the conversion logic 114.2 may receive a message (e.g., a request) in one data format and convert the message into another data format before outputting for downstream processing, as further described below. For example, the message may be received in a flat file data format, a matrix data format, a NCPDP format, or another suitable format. For example, the message may have the format of a flat file format for transmitting messages (e.g., pharmacy claims and related transactions), where the message may contain segments and segments may contain fields, where each field may contain a single data element (e.g., a name, a identifier, a drug code, a quantity), where fields and segments may be separated by non-printable ASCII characters, such as a record separator and a field separator, where the format may support various data types, such as strings, dates, integers, and decimal numbers, where numeric fields can be zero-padded, or use a "signed overpunch" technique to encode negative values. For example, for batch transmission, the format may define headers and trailers to separate multiple transactions within a single file, such as using separators to indicate start of text and end of text. For example, the format may be a flat file format having segments separated by record separators, with fields within segments separated by field separators, supporting different data types using techniques, such as zero-padding and signed overpunch. For example, the format may be NCPDP or another suitable format. For example, the conversion logic 114.2 may be programmed to receive a message (e.g., a medical claim) from the routing application program 112.2 and convert, similar to above, the message from one data format (e.g., NCPDP format, structured format, JSON format, XML format, delimited format) to another data format (e.g., structured format, JSON format, XML format, delimited format, NCPDP format) before submitting or passing the message, as converted (or a copy thereof), to the rule engine 116.2 to process the message, as converted (or a copy thereof), as disclosed herein. Likewise, the conversion logic 114.2 may be programmed to receive a message (e.g., an approval or a denial of a medical claim) from the rule engine 116.2 and convert, similar to above, the message from one data format (e.g., structured format, JSON format, XML format, delimited format, NCPDP format) to another data format (e.g., NCPDP format, structured format, JSON format, XML format, delimited format) before submitting or passing the message, as converted (or a copy thereof), to the routing application program 112.2 to process the message, as converted (or a copy thereof), as disclosed herein.

The server 116 may be an application server or another suitable server. The server 116, whether physical or virtual, may be a component of a cloud computing instance, which, in some embodiments, may be technologically advantageous over a mainframe, because the cloud computing instance may be distributed, decentralized, flexible and on-demand, which allows for easier maintenance and updates when needed, especially if following a serverless model, although the mainframe can operate as the server 116 or the server 116 can operate as the mainframe in some embodiments. In some embodiments, the server 114 and the server 116 may be one server.

The OS 116.1 may be Windows, Linux, MacOS, Android, IOS, or any other suitable OS. The rule engine 116.2 runs on the OS 116.1. The rule engine 116.2 may be a software system (e.g., a software logic, an application program, a software module) that executes business rules in a runtime environment by business users (from computing terminals) to define, manage, and automate decision-making processes based on predefined rules. For example, the rule engine 116.2 may be a task-dedicated software logic that can be started, stopped, or paused. For example, in context of medical claim processing, the rule engine 116.2 may enable automating of evaluation and adjudication of transactions based on messages (e.g., medical claims) input thereinto based on various criteria and policies, as set over the network 102 by computing terminals operated by business users. In some embodiments, the rule engine 116.2 may host the conversion logic 114.2 or the conversion logic may host the rule engine 116.2. In some embodiments, the rule engine 116.2 and the conversion logic 114.2 may be one software logic, component, application, or another suitable software form factor.

The rule engine 116.2 may have (i) a rule repository (e.g., a database) programmed to store a set of rules, (ii) a rule editor (e.g., a user interface) programmed to define, modify, and organize the set of rules using natural language or domain-specific languages as accessed from a computing terminal, (iii) a rule execution logic (e.g., a software architecture, a software module) programmed to interpret and evaluate various rules against input data or scenarios (e.g., applying rules and generating appropriate outcomes), and (iv) an integration interface (e.g., a software architecture, a software module) programmed to communicably integrate with other computing systems (e.g., EHR software, medical claim management software), to access relevant data and share those results. For example, in context of medical claim processing, the rule engine 116.2 may be used to automate various decision-making processes based on a set of predefined rules. For example, some of such rules may be (i) claim eligibility rules (e.g., if a patient's policy is not active or has expired, then reject this claim), (ii) medical coding rules (e.g., if a medical coding on a claim contains an invalid or inconsistent combination of codes, then flag the claim for review), (iii) benefit limit rules (e.g., if a claim requests an amount that exceeds an annual or lifetime benefit limit for a patient's policy, then reject or partially approve the claim), (iv) pre-existing condition rules (e.g., if a claim for a patient is related to a pre-existing condition and the patient is within his waiting period, then reject the claim), (v) claim adjudication rules (e.g., calculate a patient's deductible, co-pay, and coinsurance amounts based on a set of policy terms), (vi) compliance and regulatory rules (e.g., ensure that a claim adheres to relevant healthcare regulations, coding guidelines, and billing practices).

Some examples of business rules executable by the rule engine 116.2 may include business rules for authorization processes, workflow processes, messaging processes, e-payment processes, and other suitable processes. Some business rules may be based on Boolean logic and include if-then (or other suitable) statements, whether standalone, chained, branched, or otherwise. Some business rules may enable enrichment of messages (e.g., medical claims) by metadata, such as descriptive metadata, preservation metadata, structural metadata, provenance metadata, definitional metadata, administrative metadata, computational transaction metadata, or other suitable metadata. For example, in context of medical claim processing, the descriptive metadata may be information that describes contents and key attributes of medical claims data to aid in identification, organization, and discovery of medical claims within databases or repositories, such as claim identifiers, patient name, date of service, provider name, diagnosis codes, procedure codes, billing codes, and claim status. For example, in context of medical claim processing, the preservation metadata may be information that supports and documents long-term preservation and accessibility of electronic medical claims data, such as technical details about file formats, software, fixity information (e.g., checksums, digital signatures), chain of custody, data transformations, data permissioning, data migration, and systems used to create and manage medical claims data. For example, in context of medical claim processing, the structural metadata may be information that describes organization, structure, and relationships within medical claims data, such as internal structure and components of messages (e.g., medical claims), different sections or fields within data structures (e.g., documents, files), different data elements within messages (e.g., medical claims), such as linking diagnosis codes to specific procedure identifiers or service identifiers, different connections between messages (e.g., medical claims) and related documents or files, such as supporting medical records, attachments, or supplemental information, hierarchical structure of claims data, such as how individual messages (e.g., medical claims) are organized within larger claim batches or submissions, different file formats, data types, and technical specifications used to store and transmit medical claims data, different data integrations by mapping structures of claims data to standardized data models or schemas used in claims processing systems. For example, in context of medical claim processing, the provenance metadata may be information that tracks origin, history, and lineage of medical claims data by providing detailed audit trails of data sources, transformations, and processes involved in creation/handling of messages (e.g., medical claims), such as identifiers of healthcare providers, insurance companies that generated initial claims data, information about computing systems, applications, and tools used to process, transform, or transmit messages (e.g., medical claims) at various stages, sequences of actions, processes, and any modifications applied to claims data, establishing clear data lineages, identifies user profiles permissioned for creating, modifying, or approving messages (e.g., medical claims) at different points in time, various timestamps and versioning information to reconstruct the chronological history of changes to messages (e.g., medical claims). For example, in context of medical claim processing, the definitional metadata may be information that indicates meaning and semantics of data elements within messages (e.g., medical claims), such as definitions or descriptions of codes (e.g., International Classification of Diseases (ICD), Current Procedural Terminology (CPT), National Drug Code (NDC)) used in claims, explanations of terminology or abbreviations used in data fields within messages (e.g., medical claims), data dictionaries or glossaries that provide precise meaning of data elements like claim types, billing statuses, or provider specialties, details on how specific data values are calculated or derived, such as claim payment amounts based on coverage rules, mappings between coded values in claims and their textual descriptions or labels, and business rules or validation criteria that define acceptable values or formats for claims data. For example, in context of medical claim processing, the administrative metadata may be structured data elements that provide essential information about medical services rendered, patient details, provider information, and billing codes to enable accurate claims processing, reimbursement, and data analysis. The administrative metadata may include patient information (e.g., patient name, date of birth, gender, address, insurance policy number, group number, patient medical record number), provider information (e.g., provider name, National Provider Identifier (NPI), provider specialty, taxonomy codes, provider address, contact information), service details (e.g., service date(s), diagnosis codes (e.g., ICD codes) describing patient's condition, procedure codes (e.g., CPT codes) for services rendered, service location), billing information (e.g., charges for each service, modifiers for procedures, place of service codes, rendering provider information). For example, the administrative metadata can be on standardized claim forms, such as CMS-1500 or UB-04, or in EDI formats, such as X12 837. For example, in context of medical claim processing, the computational transaction metadata may be information (e.g., textual, structured, unstructured, descriptive) that provides context and details beyond a basic transaction information, such as sender, receiver, and an amount of payments indicated or stated to be transferred. This information may enhance at least some efficiency, accuracy, and automation of claim (e.g., message) processing. For example, the computational transaction metadata may include patient or provider demographics, such as a member identification number (e.g., a unique identifier for a patient), a national provider identifier (e.g., a unique identifier for a healthcare providers), a claim reference number (e.g., a unique identifier for each claim, facilitating tracking and re-association of attachments with the correct transaction. For example, the computational transaction metadata may include transaction details, such as service dates, procedure codes (e.g., standardized codes, CPT, ICD or others that describe medical procedures and diagnoses), billing information (e.g., details about various costs associated with various services provided). For example, the computational transaction metadata may include attachments and documentation, such as electronic attachments (e.g., documents, medical records, lab results, and imaging reports that support a particular claim and metadata may help in re-association of these attachments with corresponding claims) and reference numbers (e.g., link attachments to correct administrative transactions to reducing manual intervention). For example, the computational transaction metadata may include policy and authorization data, such as pre-authorization information (e.g., data regarding prior approvals for specific treatments or procedures) and policy details (e.g., information about patient's insurance coverage including limits and exclusions). For example, the computational transaction metadata may include security and compliance information, such as encryption and digital signatures or audit trails (e.g., metadata that tracks who accessed or modified a data item to ensure compliance with regulations like HIPAA). Therefore, the computational transaction metadata may improve accuracy (e.g., reducing errors in matching information), automation (e.g., providing structured data for interpretation by machine learning or other automation software), and data management (e.g., organization of large volumes of data to efficiently expedite workflow), while staying compliant with regulatory requirements, protective sensitive information and ensuring secure transactions. As such, the rule engine 116.2 may be programmed to enrich messages (e.g., medical claims) with various metadata for application via the business rules.

The database 120 may be a relational database, a graph database, a vector database, a multi-model database or another suitable database. The rule engine 116.2 is programmed to interface (e.g., read, write, delete, query, retrieve, store, search) with the database 120. The database 120 is shown to be hosted off the server 116, which may be on another server (e.g., a database server hosting a DBMS). However, note that this configuration is not required and the server 116 may host the database 120 such that the database 120 runs on the OS 116.1, which may enable the rule engine 116.2 to apply rules more efficiently (e.g., faster).

The database 120 may have a schema (e.g., flat, hierarchical, network, relational, star, snowflake) according to which the database 120 stores its records. For example, in context of medical claim processing, the database 120 may have a set of tables (e.g., related to each other by a primary key) storing data (e.g., textual, structured, unstructured, descriptive) for configurations of patient profiles (e.g., personal information, medical history), a set of tables (e.g., related to each other by a primary key) storing data (e.g., textual, structured, unstructured, descriptive) for configurations of payor profiles (e.g., policy information, policy limits), a set of tables (e.g., related to each other by a primary key) storing data (e.g., textual, structured, unstructured, descriptive) for configurations of prescription profiles (e.g., dosages, side effects), a set of tables (e.g., related to each other by a primary key) storing data (e.g., textual, structured, unstructured, descriptive) for configurations of prescriber profiles (e.g., personal information, prescription history), a set of tables (e.g., related to each other by a primary key) storing data (e.g., textual, structured, unstructured, descriptive) for configurations of product profiles (e.g., name, dosages), a set of tables (e.g., related to each other by a primary key) storing data (e.g., textual, structured, unstructured, descriptive) for configurations of pharmacy software (e.g., input parameters, processing parameters, output parameters), and a set of tables (e.g., related to each other by a primary key) storing data (e.g., textual, structured, unstructured, descriptive) for configurations of place of service profiles (e.g., a set of attributes descriptive of a physical pharmacy). At least two of these sets of tables may be related to each other (e.g., via a primary key).

The database 120 may have the schema be a relational schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

The server 118 may be an application server or another suitable server. The server 118, whether physical or virtual, may be a component of a cloud computing instance, which, in some embodiments, may be technologically advantageous over a mainframe, because the cloud computing instance may be distributed, decentralized, flexible and on-demand, which allows for easier maintenance and updates when needed, especially if following a serverless model, although the mainframe can operate as the server 118 or the server 118 can operate as the mainframe in some embodiments. In some embodiments, the server 116 and the server 118 may be one server.

The OS 118.1 may be Windows, Linux, MacOS, Android, IOS, or any other suitable OS. The OS 118.1 hosts the web portal logic 114.2, which may be embodied as an application program, a software module, a software engine, an API, or another suitable logical form factor. The web portal logic 118.2 may be programmed to enable a web portal to generate a web page specific to a request accessible via a URL, as further described below.

The database 122 may be a relational database, a graph database, a vector database, a multi-model database or another suitable database. The web portal logic 118.2 is programmed to interface (e.g., read, write, delete, query, retrieve, store, search) with the database 122. The database 122 is shown to be hosted off the server 118, which may be on another server (e.g., a database server hosting a DBMS). However, note that this configuration is not required and the server 118 may host the database 122 such that the database 122 runs on the OS 118.1, which may enable the web portal logic 118.2 to operate more efficiently (e.g., faster). The database 122 maintains (e.g., creates, stores, updates, deletes) a set of records that enables the web portal logic 118.2 to operate, as further described below.

Figure 2:
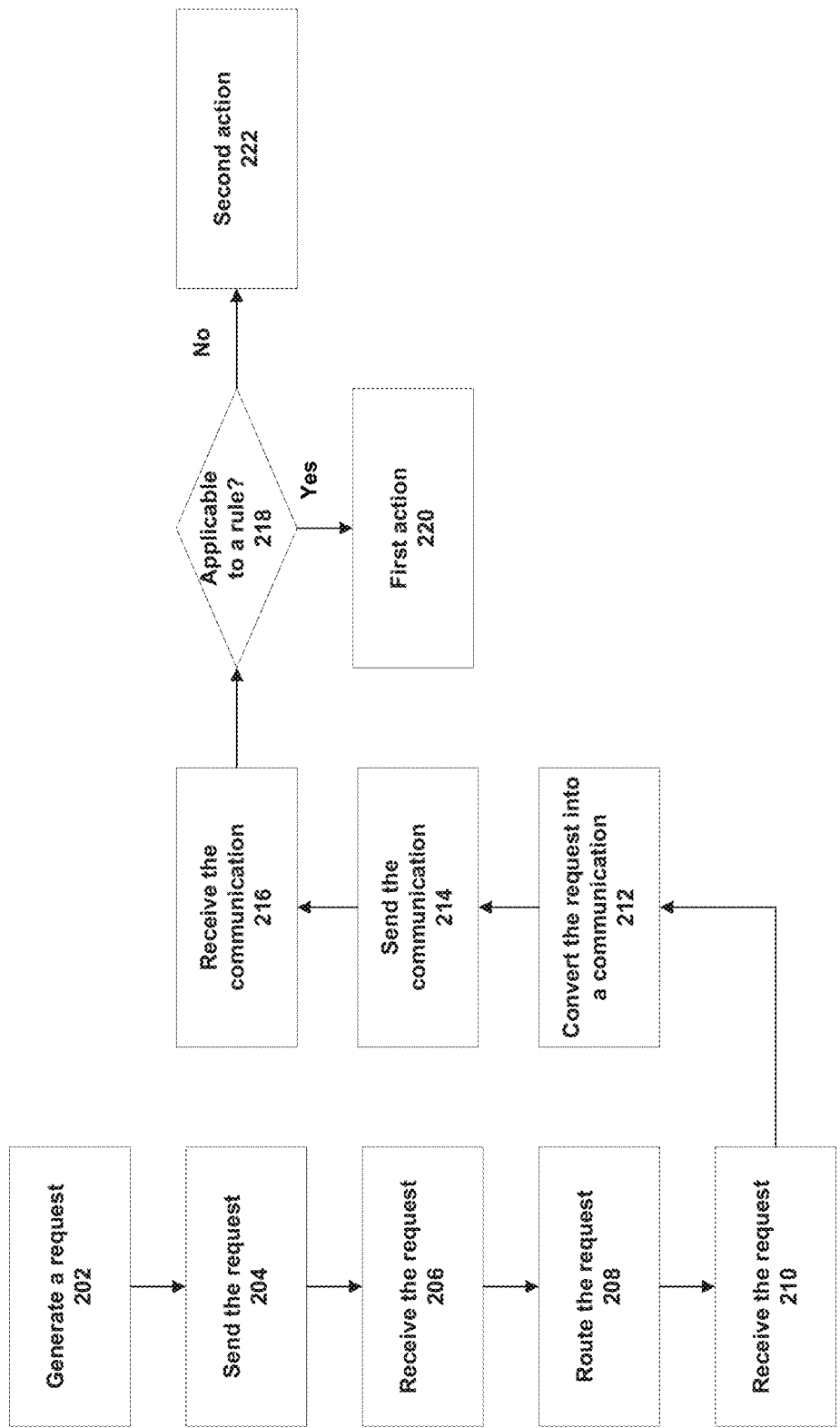
FIG. 2 shows a flowchart of an embodiment of a method for providing guidance to end users in completing transactions with user actions using the system of FIG. 1 according to this disclosure.

FIG. 2 shows a flowchart of an embodiment of a method for providing guidance to end users in completing transactions with user actions using the system of FIG. 1 according to this disclosure. FIG. 4A to FIG. 4D show a set of diagrams of a set of embodiments of a set of screenshots enabling a user action pursuant to FIG. 1 to FIG. 3 according to this disclosure. In particular, there is a process 200 having a set of blocks 202-222 performed by the system 100 that enables a set of screenshots 400 having a screenshot 402, a screenshot 404, a screenshot 406, and a screenshot 408.

In block 202, the first end user application program 104.2 generates a request (e.g., a message containing an alphanumeric content expressing a medical claim) associated with a profile (e.g., a patient profile). The request may be generated based on an input (e.g., a physical or virtual keyboard, a microphone, a camera) from a user (e.g., a pharmacist or a pharmacy technician) operating the first end user application program 104.2 in a locale (e.g., a room, a building, a pharmacy, a hospital) or received from a data source (e.g., an API, an FTP site) over the network 102. For example, if the first end user application program 104.2 is the browser application program, then the browser application program may be logged into a web-based pharmacy application program over the network 102 to generate the request, where the web-based pharmacy application program is hosted in a server remote from the first computing terminal 104, the second computing terminal 106, the third computing terminal 108, the server 110, the server 112, the server 114, the serve 116, the server 118, the database 120, or the database 122. For example, if the first end user application program 104.2 is the pharmacy application program, then the pharmacy application program generates the request. The request may have various data (e.g., an alphanumeric content), such as patient data, medication data, dosage data, insurance data, or other suitable data, according to what is described in context of FIG. 1. The request may be formatted in a first data format, such as a structured format, delimited format, a flat data file, an NCPDP format, a matrix format, an XML format, or another suitable format.

In block 204, the first end user application program 104.2 sends the request (or a copy thereof) in the first data format to the routing application program 112.2 over the network 102 from the first computing terminal 104 to the server 112, which may be instructed by the user.

In block 206, the routing application program 112.2 receives the request (or a copy thereof) in the first data format from the first end user application program 104.2 over the network 102 from the first computing terminal 104 at the server 112.

In block 208, the routing application program 112.2 routes (e.g., switches, sends) the request (or a copy thereof) in the first data format to the conversion logic 114.2 hosted on the server 114. The routing application program 112.2 may route the request based on what content is inside the request or information sourced from the request, according to what is described in context of FIG. 1. For example, such routing may be physical or logical, which may be indicated based on addressing or routing information inside the request, as instructed by the user at the first end user application program 104.2.

In block 210, the conversion logic 114.2 receives the request (or a copy thereof) in the first data format from the routing application program 112.2 over the network 102 from the server 112 at the server 114.

In block 212, the conversion logic 114.2 converts the request into a communication (e.g., a message) in a second data format different from the first data format in which the request was received by the conversion logic 114.2. Such conversion may be on receipt of the request in the first data format by the conversion logic 114.2 from the routing application program 112.2. As such, the communication in the second data format may be generated based on the request or may contain information sourced (e.g. copied) from the request. For example, such generation may involve converting or formatting the communication into the second data format different from how the request is formatted in the first data format when received from the first end user application program 104.2. For example, the second data format may be a structured format, a delimited format, a hierarchical format, a tree format, a graph format, a CSV format, a JSON format, an XML format, or another suitable format. For example, if the request was received formatted in the first data format, such as a flat data file, a NCPDP format, a matrix format, or another suitable format, then the communication may be converted to be formatted in the second data format, such as a structured format, a delimited format, a hierarchical format, a tree format, a graph format, a CSV format, a JSON format, an XML format, or another suitable format. For example, the first data format may be NCPDP format and the second data format is a structured format (e.g., JSON, XML, CSV).

In block 214, the conversion logic 114.2 sends the communication (or a copy thereof) in the second data format to the rule engine 116.2 over the network 102 from the server 114 to the server 116.

In block 216, the rule engine 116.2 receives the communication (or a copy thereof) in the second data format over the network 102 from the server 114 at the server 116.

In block 218, since, as explained above, the rule engine 116.2 has the set of rules, the rule engine 116.2 determines whether the communication is applicable to at least one rule of the set of the rules. For example, the rule engine 116.2 may contain a set of business rules, which may be set by a computing terminal (e.g., a desktop computer, a laptop computer), where an applicability of the communication to at least one rule of the set of rules may may be associated with or a grant (partial or full) of an approval (partial or full) of a transaction based on or involving the request, whereas an inapplicability of the communication to at least one rule of the set of rules may may associated with or an issuance (partial or full) of a denial (partial or full) of the transaction based on or involving the request. For example, the rule engine 116.2 may be programmed for business rules to be forward-chaining (e.g., processing condition-action rules) or reactive (e.g., detecting and reacting to events and patterns). As such, the rule engine 116.2 may receive the communication (or a copy thereof) in the second data format and determine whether the communication in the second data format is applicable to at least one rule of the set of rules. For example, the rule engine 116.2 may receive the communication (or a copy thereof) in the second data format from the routing application program 112.2 through the conversion logic 114.2, as mentioned above. As such, the rule engine 116.2 may receive the communication (or a copy thereof) in the second data format as converted by the conversion logic 114.2. The rule engine 116.2 may determine whether the communication is applicable to at least one rule of the set of rules based on sourcing (e.g., copying) information (e.g. alphanumeric content in fields) from the communication in the second data format and attempting to apply such information to at least one rule of the set of rules, or vice versa. Note that during or to further enable the rule engine 116.2 to determine whether the communication is applicable to at least one rule of the set of the rules, the rule engine 116.2 may access various metadata, as described in context of FIG. 1, to enrich (e.g., augment, supplement) the communication and then query the database 120, if needed, for more relevant or additional information to determine whether the communication is applicable to at least one rule of the set of the rules, or vice versa. One example of this metadata is disclosed in context of FIG. 3.

In block 220, if the rule engine 116.2 determines in block 218 that the communication is applicable to at least one rule of the set of the rules (yes), then the rule engine 116.2 takes a first action (which may include a plurality of tasks) based on the communication being applicable to at least one rule of the set of rules. For example, the communication may be applicable such that the request originating from the first end user application program 104.2 is approved (partially or fully) or indicated to be approved (partially or fully), subject to a user action, which may be desired to authenticate, approve, initiate, or decline a certain workflow, as further described below.

Figure 4D:
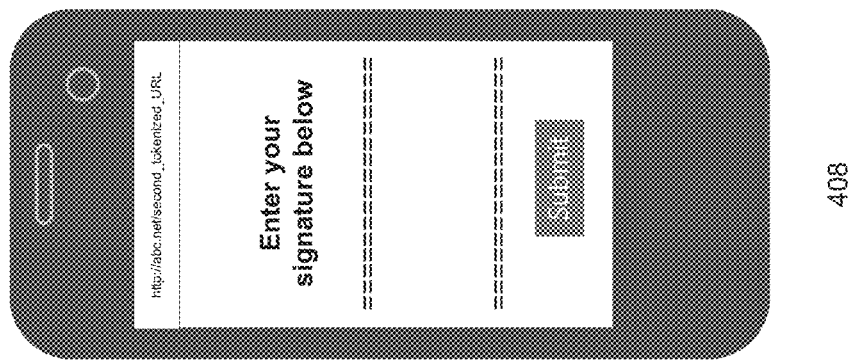

The first action includes the rule engine 116.2 generating a response (e.g., a message) to the communication containing at least a first tokenized URL, where the response is in the second data format, and sending the response (or a copy thereof) in the second data format to the conversion logic 114.2 over the network 102 from the server 116 to the server 114. For example, the response may contain an approval (partial or full) or an indication (e.g., an alphanumeric string, a symbol, an image, a barcode) of an approval (partial or full) of the request, as originally submitted from the first end user application program 104.2. For example, the first tokenized URL may be set for a one-time access. As such, the conversion logic 114.2 receives the response (or a copy thereof) from the rule engine 116.2, generates a reply (e.g., a message) to the request containing the first tokenized URL based on the response, where the reply is in the first data format as converted by the conversion logic 114.2 from the response received in the second data format from the rule engine 116.2, and sends the reply (or a copy thereof) in the first data format to the routing application program 112.2 over the network 102 from the server 114 to the server 112. For example, the reply may contain an approval (partial or full) or an indication (e.g., an alphanumeric string, a symbol, an image, a barcode) of an approval (partial or full) of the request, as originally submitted from the first end user application program 104.2. The routing application program 112.2 receives the reply (or a copy thereof) from the conversion logic 114.2 and routes the reply (or a copy thereof) in the first data format to the first end user application program 104.2 over the network 102 from the server 112 to the first computing terminal 104, similar to what is described above. Therefore, the first end user application program 104.2 receives the reply (or a copy thereof) from the routing application program 112.2, displays at least the first tokenized URL sourced from the reply, and is enabled to activate the first tokenized URL displayed in the first end user application program 104.2, as shown in FIG. 4A as the screenshot 402, where the first end user application program 104.2 may be operated by a pharmacist, for example. For example, the reply may contain an approval (partial or full) or an indication (e.g., an alphanumeric string, a symbol, an image, a barcode) of an approval (partial or full) of the request, as originally submitted from the first end user application program 104.2. For example, the first tokenized URL can be activated by the user clicking (e.g., by operating a cursor) the first tokenized URL in the first end user application program 104.2 when the first end user application program 104.2 displays the first tokenized URL sourced from the reply. Since the first end user application program 104.2 may not be enabled to view a first web page accessible from the first tokenized URL (e.g., disabled, unabled, firewalled, secured, locked), in response to the end user activating the first tokenized URL in the first end user application program 104.2 when the first tokenized URL is displayed in the first end user application program 104.2, the second end user application program 106.2 attempts to open the first web page accessible from the first tokenized URL, which may occur when the second end user application program 106.2 is a web browser application program or has a web browsing functionality (e.g., a web browsing software module or engine). Such attempt to open the first web page accessible from the first tokenized URL from the second end user application program 106.2 may enable (e.g., query, instruct, request) the web portal logic 118.2 to cause the web portal to generate the first web page specific (e.g., unique or custom) to the request and be accessible via the first tokenized URL from the second end user application program 106.2, as shown in FIG. 4B as the screenshot 404, where the second end user application program 106.2 may be operated by a pharmacist, for example. As such, the first web page simultaneously displays a form having a virtual selector (e.g., a button, a radio button, a checkbox, a gradual level selector, a slider, a dial, a knob, a dropdown menu) programmed to receive a user selection of a mode of communication (e.g., text messaging, chat messaging, email messaging, phone calling) and a text field programmed to receive a destination identifier (e.g., an alphanumeric string, a code) according to the mode of communication (e.g., a phone number, a cell phone number, a screenname, a social media handle, an email address, a profile name) such that the web portal receives the user selection from the virtual selector and the destination identifier from the text field when the form is completed and submitted (e.g., by pressing a submit button), stores the selection and the destination identifier in the database 122, and triggers the communication protocol logic 110.2 over the network 102. In response, the communication protocol logic 110.2 generates a notification (e.g., a message) containing at least a second tokenized URL specific (e.g., unique or custom) to the request (e.g., different from the first tokenized URL) and sends the notification (or a copy thereof) over the network 102 according to the selection of the mode of communication (e.g., by phone, text message, chat message, email message) and the destination identifier, each read from the database 122, to the third end user application program 108.2 at the third computing terminal 108. For example, the notification can be a text message, a phone call, a chat message, an email message, or another suitable message containing a guidance to proceed (e.g., click hyperlink below), where the notification is sent according to the selection of the mode of communication based on the destination identifier. For example, the second tokenized URL may be set for a one-time access. Therefore, the third end user application program 108.2 receives the notification (or a copy thereof) from the communication protocol logic 110.2, displays the second tokenized URL sourced (e.g., copied) from the notification, and is enabled to activate the second tokenized URL displayed in the third end user application program 108.2, as shown in FIG. 4C as the screenshot 406, where the third end user application program 108.2 may be operated by a patient, for example. For example, the second tokenized URL can be activated by the user clicking (e.g., by operating a cursor) the second tokenized URL in the third end user application program 108.2 when the third end user application program 108.2 displays the second tokenized URL sourced (e.g., copied) from the notification. Since the third end user application program 108.2 may not be enabled to access a second web page accessible from the second tokenized URL (e.g., disabled, unabled, firewalled, secured, locked), in response to the end user activating the second tokenized URL in the third end user application program 108.2 when the second tokenized URL is displayed in the third end user application program 108.2, the browser application program (or an application program with a web browsing functionality) hosted on the third OS 108.1 of the third computing terminal 108 attempts to open the second web page from the second tokenized URL specific to the request generated by the web portal to enable the user action at the third computing terminal 108, which may be desired to authenticate, approve, initiate, or decline certain workflows, into the third computing terminal 108 to complete (partially or fully) a transaction involving the request, as shown in FIG. 4D as the screenshot 408, where the third computing terminal 108 may be operated by a patient, for example.

Note that the third end user application program 108.2 may contain the browser application program (or an application program with a web browsing functionality) or the third end user application program 108.2 and the browser application program (or an application program with a web browsing functionality) are separate and distinct from each other and both simultaneously running (background or foreground) on the OS 108.1. For example, the third end user application program 108 may be a messenger application program (e.g., text, chat, email, social media network) running on the OS 108.1 together with the browser application program (or an application program with a web browsing functionality), where the user action happens through the browser application program (or an application program with a web browsing functionality).

The user action may be entering a virtual signature (e.g., similar to a DocuSign signature) into the third computing terminal 108 to complete the transaction involving the request. For example, the virtual signature may be entered by operating a cursor device (e.g., a computer mouse), a touchpad, a stylus, a finger, or another suitable modality, within the browser application program (or an application program with a web browsing functionality). Note that the virtual signature can also be preset and the user action may include instructing the virtual signature to be entered as preset. The user action may be entering a biometric into the third computing terminal 108 to complete the transaction involving the request. For example, the biometric can be a fingerprint, a retinal scan, or a voice input. The user action may be activating a video (e.g., a YouTube video) to be played in the browser application program (or an application program with a web browsing functionality). The user action may be scrolling (vertically or horizontally) through a set of text (e.g., a waiver, a contract) until an end thereof, to indicate review thereof. The user action may involve the browser application program (or an application program with a web browsing functionality) hosted on the third OS 108.1 of the third computing terminal 108 running, querying, engaging, communicating, or interfacing with a logic (e.g., an API, an software module, a software engine, an application program) local to the third computing terminal 108 (e.g., edge processing) or remote to the third computing terminal 108 (e.g., interfacing with a server over the network 102), whether the second web page accessible via the second tokenized URL is or is not running, querying, engaging, communicating, or interfacing with the logic.

In block 222, if the rule engine 116.2 determines in block 218 that the communication is inapplicable (not applicable) to at least one rule of the set of the rules (no), then the rule engine 116.2 takes a second action based on the communication being inapplicable to at least one rule of the set of rules. As such, when the communication is a first communication and the response is a first response, the request may be resubmitted in the first data format from the first end user application program 104.2 to the conversion logic 114.2, as described above, based on (e.g., responsive to or included in) the second action (e.g., at least partial denial of the transaction) such that the conversion logic 114.2 converts the request as resubmitted into a second communication in the second data format and sends the second communication to the rule engine 116.2 such that the rule engine 116.2 determines that the second communication is applicable to the at least one rule (e.g., at least partially approved the request as resubmitted) and generates a second response containing a binary content (e.g., approved or denied, true or false) to be communicated to the first end user application program 104.2 to complete the transaction involving the request, especially when there is a limit on such iteration. This step may be repeated indefinitely or until a cap (e.g., 3 times) is reached and an error or a help message may be displayed on the first end user application program 104.2. Note that the request may be amended at the first end user application program 104.2 (e.g., fix what was wrong with the request originally) before being resubmitted in the first data format from the first end user application program 104.2 to the conversion logic 114.2 based on the second action.

Note that the first computing terminal 104 and the second computing terminal 106 may be one first/second computing terminal 104/106. As such, the process 200 may involve the first/second computing terminal 104/106 and the third computing terminal 108, which may be geographically spaced apart from each other (e.g., different rooms, buildings, streets, cities). However, note that the first computing terminal 104 and the second computing terminal 106 may physically separate and distinct from each other. Therefore, the process 200 may involve the first computing terminal 104, the second computing terminal 106, and the third computing terminal 108. As such, the first computing terminal 104 and the second computing terminal 106 may be collocated (e.g., same room, same cubicle). For example, the first computing terminal 104 and the second computing terminal 106 may be co-positioned in a defined physical area (e.g., a cubicle, a room). For example, the first computing terminal 104 and the second computing terminal 106 may be physically collocated within the defined physical area. For example, the first computing terminal 104 and the second computing terminal 106 may be spaced apart from each other at about 1 meter or less, whether on a horizontal plane, a vertical plane, or a diagonal plane, which may allow the first computing terminal 104 and the second computing terminal 106 to simultaneously be within a physical reach of a hand of a user operating the first computing terminal 104 and the second computing terminal 106 (e.g., similar to an airplane cockpit). For example, the first computing terminal 104 and the second computing terminal 106 may be positioned side-by-side each other to simultaneously be within the physical reach of the hand of the user operating the first computing terminal 104 and the second computing terminal 106 (e.g., similar to an airplane cockpit). For example, the second computing terminal 106 may be attached (e.g., via an articulating arm, a stand, a bracket) to the first computing terminal 104 or a surface adjacent thereto (e.g., a wall). For example, the first computing terminal 104 and the second computing terminal 106 may be disposed on a common surface (e.g., a shelf, a tabletop, a stand). However, note that this configuration is not required and the first computing terminal 104 and the second computing terminal 106 may be disposed on different surfaces (e.g., one on a shelf and one on a tabletop). Likewise, note that the first computing terminal 104 and the second computing terminal 106 may not be collocated. Likewise, the third computing terminal 108 may or may not be collocated with the first computing terminal 104 or the second computing terminal 106 (e.g., geographically spaced apart from each other (e.g., different rooms, buildings, streets, cities).

Figure 3:
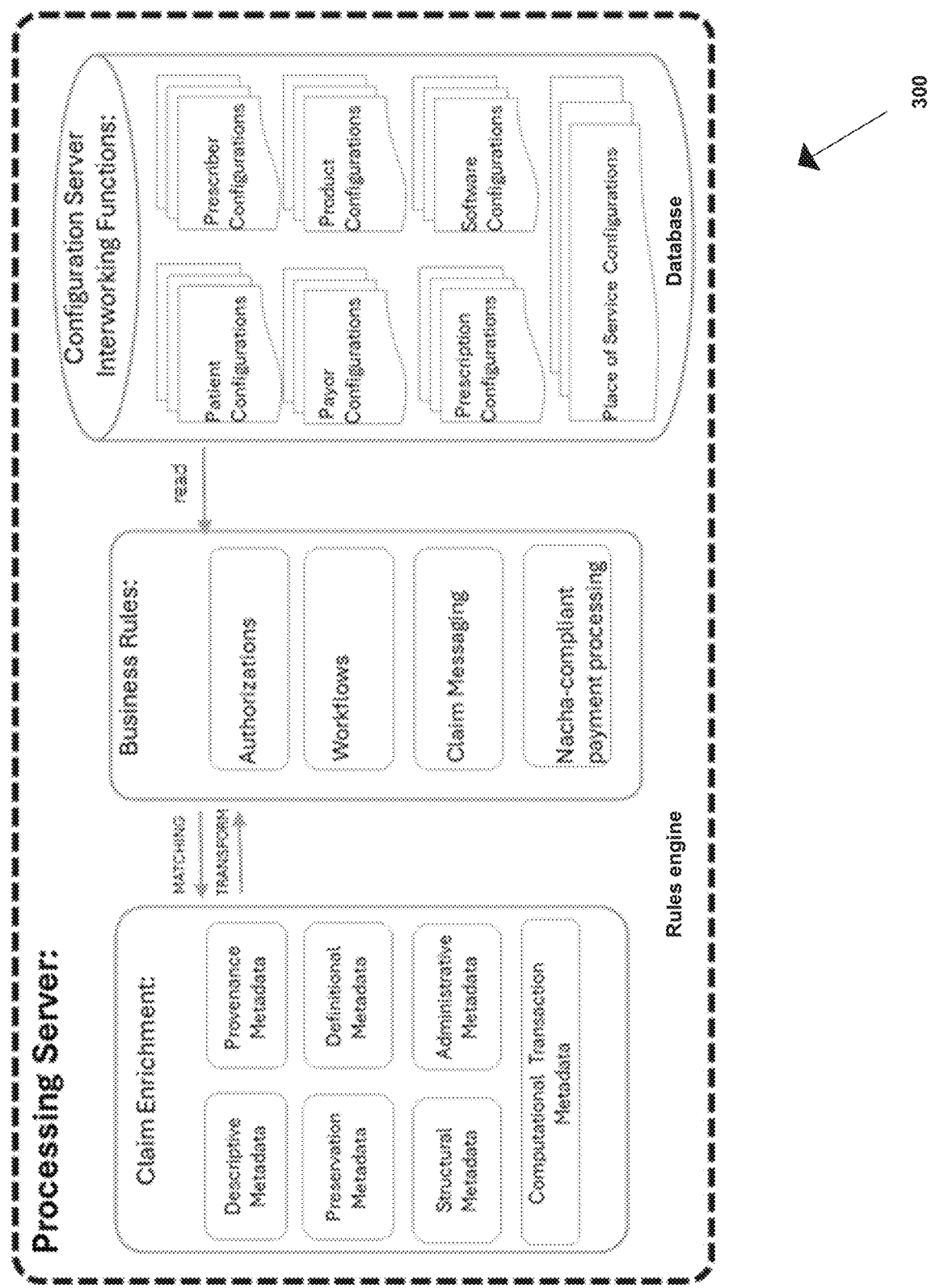
FIG. 3 shows a diagram of an embodiment of a rule engine and an embodiment of a database each configured for use in the system of FIG. 1 to perform the method of FIG. 2 according to this disclosure.

FIG. 3 shows a diagram of an embodiment of a rule engine and an embodiment of a database each configured for use in the system of FIG. 1 to perform the method of FIG. 2 according to this disclosure. In particular, there is a diagram 300 schematically illustrating the rule engine 116.2 and the database 120 usable by the system 100. As shown in FIG. 3, there is a server hosting the rule engine 116.2 and the database 120. However, note that such configuration is not required and there may be one server hosting the rule engine 116.2 and another server hosting the database 120, where the rule engine 116.2 is enabled to interface with the database 120, as disclosed herein.

As explained above, the rule engine 116.2 may store various metadata (e.g., descriptive, preservation, structural, provenance, definitional, administrative, computational transaction) and various business rules (e.g., authorization rules, workflow rules, messaging rules, standard compliance rules), which enable the rule engine 116.2 to enrich messages received from the conversion logic 114.2. For example, the rule engine 116.2 may receive a message (e.g., a communication) from the conversion logic 114.2, as disclosed herein, and enrich the message with at least some metadata (e.g., descriptive, preservation, structural, provenance, definitional, administrative, computational transaction) to transform (e.g., augment, supplement) the message. Then, the rule engine 116.2 may apply at least some business rules to the message, as transformed, where such application may involve querying the database 120, as needed.

As explained above, the database 120 may have a schema (e.g., flat, hierarchical, network, relational, star, snowflake) according to which the database 120 stores its records. For example, in context of medical claim processing, the database 120 may have a set of tables (e.g., related to each other by a primary key) storing data (e.g., textual, structured, unstructured, descriptive) for configurations of patient profiles, a set of tables (e.g., related to each other by a primary key) storing data (e.g., textual, structured, unstructured, descriptive) for configurations of payor profiles, a set of tables (e.g., related to each other) storing data (e.g., textual, structured, unstructured, descriptive) for configurations of prescription profiles, a set of tables (e.g., related to each other by a primary key) storing data (e.g., textual, structured, unstructured, descriptive) for configurations of prescriber profiles, a set of tables (e.g., related to each other by a primary key) storing data (e.g., textual, structured, unstructured, descriptive) for configurations of product profiles, a set of tables (e.g., related to each other by a primary key) storing data (e.g., textual, structured, unstructured, descriptive) for configurations of pharmacy software (e.g., input parameters, processing parameters, output parameters), and a set of tables (e.g., related to each other) storing data (e.g., textual, structured, unstructured, descriptive) for configurations of place of profiles. At least two of these sets of tables may be related to each other (e.g., via a primary key).

As explained above, the database 120 may have the schema be a relational schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

Therefore, the rule engine 116 is enabled to operate as a software wizard to guide the user of the third end user application program 108.2 to get the request approved, while also enabling a user action to authenticate, approve, initiate, or decline a certain workflow (e.g., confirm identity, request payment). Such configuration is technologically advantageous, because of its enablement in providing guidance to end users in completing transactions with user actions. For example, this functionality enables the rule engine 116.2 to allow (i) expressing complex logic (e.g., to enable the first action or the second action), (ii) handling time/event synchronization (e.g., to enable efficient transaction processing), (iii) providing insights into rule execution (e.g., what information or action is needed to complete the transaction with a certain workflow), and (iv) modeling uncertainties (e.g., how to get the transaction completed with a certain workflow).

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network, a neutrino network, an optical network (e.g., Li-Fi, fiberoptics), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled persons know that various modifications, additions, substitutions and the like can be made without departing from the spirit of this disclosure. As such, these are considered to be within the scope of the disclosure, as defined in the following claims.

What is claimed is:

1. A system, comprising:
a first computing terminal hosting a first end user application program;
a second computing terminal hosting a second end user application program;
a third computing terminal hosting a third end user application program and a browser;
a first server hosting a routing application program;
a second server hosting a conversion logic;
a third server hosting a rule engine having a set of rules;
a fourth server hosting a communication protocol logic;
a web portal; and
a database accessible via the web portal,
wherein (i) the first end user application program generates a request associated with a profile in a first data format and sends the request to the routing application program such that (ii) the routing application program routes the request to the conversion logic, (iii) the conversion logic receives the request, converts the request into a communication in a second data format, and sends the communication to the rule engine such that (iv) the rule engine receives the communication, determines whether the communication is applicable to at least one rule of the set of the rules, and takes a first action based on the communication being applicable to the at least one rule and a second action based on the communication being inapplicable to the at least one rule,
wherein the first action includes (i) the rule engine generating a response to the communication containing a first tokenized Uniform Resource Locator (URL) in the second data format and sending the response to the conversion logic such that (ii) the conversion logic generates a reply to the request containing the first tokenized URL in the first data format based on the response and sends the reply to the routing application program, (iii) the routing application program routes the reply to the first end user application program to enable (iv) the first end user application program activate the first tokenized URL, (v) the second end user application program open the first tokenized URL, (vi) the web portal generate a first web page specific to the request accessible via the first tokenized URL from the second end user application program where the first web page contains a selector programmed to receive a selection of a mode of communication and a text field programmed to receive a destination identifier such that the web portal receives the selection from the selector and the destination identifier from the text field, stores the selection and the destination identifier in the database, and triggers the communication protocol logic such that (vii) the communication protocol logic generates a notification containing a second tokenized URL specific to the request and sends the notification according to the selection and the destination identifier each read from the database to the third end user application program such that the second tokenized URL is activatable from the third end user application program to enable the browser to present a second web page specific to the request generated by the web portal to enable a user action into the third computing terminal to complete a transaction involving the request.

2. The system of claim 1, wherein the communication is a first communication, wherein the response is a first response, wherein the request is resubmitted in the first data format from the first end user application program to the conversion logic based on the second action such that the conversion logic converts the request as resubmitted into a second communication in the second data format and sends the second communication to the rule engine such that the rule engine determines that the second communication is applicable to the at least one rule and generates a second response containing a binary content to be communicated to the first end user application program to complete the transaction involving the request.

3. The system of claim 2, wherein the request is amended before being resubmitted in the first data format from the first end user application program to the conversion logic based on the second action.

4. The system of claim 1, wherein the user action is entering a virtual signature into the third computing terminal to complete the transaction involving the request.

5. The system of claim 1, wherein the user action is entering a biometric into the third computing terminal to complete the transaction involving the request.

6. The system of claim 5, wherein the biometric is a fingerprint or a retinal scan.

7. The system of claim 5, wherein the biometric is a voice input.

8. The system of claim 1, wherein the user action is playing a video in the browser.

9. The system of claim 1, wherein the first computing terminal and the second computing terminal are one computing terminal.

10. The system of claim 1, wherein the first computing terminal and the second computing terminal are physically separate and distinct from each other.

11. The system of claim 1, wherein the first data format is a National Council for Prescription Drug Programs (NCPDP) format and the second data format is a structured format.

12. The system of claim 10, wherein the structured format is a JavaScript Object Notation (JSON).

13. The system of claim 1, wherein the first computing terminal and the second computing terminal are collocated.

14. The system of claim 1, wherein the first computing terminal and the second computing terminal are not collocated.

15. The system of claim 1, wherein the first tokenized URL is set for a one-time access.

16. The system of claim 1, wherein the second tokenized URL is set for a one-time access.

17. The system of claim 1, wherein the third computing terminal is not collocated with the first computing terminal and the second computing terminal.

18. The system of claim 1, wherein the third end user application program contains the browser.

19. The system of claim 1, wherein the third end user application program and the browser are separate and distinct from each other.

20. A method, comprising:
running a rule engine such that (i) a first end user application program hosted on a first computing terminal generates a request associated with a profile in a first data format and sends the request to a routing application program hosted on a first server, (ii) the routing application program routes the request to a conversion logic hosted on a second server, (iii) the conversion logic receives the request, converts the request into a communication in a second data format, and sends the communication to a rule engine having a set of rules and hosted on a third server, (iv) the rule engine receives the communication, determines whether the communication is applicable to at least one rule of the set of the rules, and takes a first action based on the communication being applicable to the at least one rule and a second action based on the communication being inapplicable to the at least one rule,
wherein the first action includes (i) the rule engine generating a response to the communication containing a first tokenized Uniform Resource Locator (URL) in the second data format and sending the response to the conversion logic such that (ii) the conversion logic generates a reply to the request containing the first tokenized URL in the first data format based on the response and sends the reply to the routing application program, (iii) the routing application program routes the reply to the first end user application program to enable (iv) the first end user application program activates the first tokenized URL, (v) a second end user application program hosted on a second computing terminal opens the first tokenized URL, (vi) a web portal generates a first web page specific to the request accessible via the first tokenized URL from the second end user application program where the first web page contains a selector programmed to receive a selection of a mode of communication and a text field programmed to receive a destination identifier such that the web portal receives the selection from the selector and the destination identifier from the text field, stores the selection and the destination identifier in a database accessible via the web portal, and triggers a communication protocol logic hosted on a third server such that (vii) the communication protocol logic generates a notification containing a second tokenized URL specific to the request and sends the notification according to the selection and the destination identifier each read from the database to a third end user application program hosted on a third computing terminal such that the second tokenized URL is activatable from the third end user application program to enable a browser hosted on the third computing terminal to present a second web page specific to the request generated by the web portal to enable a user action into the third computing terminal to complete a transaction involving the request.

\* \* \* \* \*